US007401178B1

United States Patent
Tene et al.

(10) Patent No.: US 7,401,178 B1
(45) Date of Patent: Jul. 15, 2008

(54) EXPANDED MEMORY SPACE IN ENVIRONMENTS INCLUDING VIRTUAL MACHINES

(75) Inventors: Gil Tene, San Carlos, CA (US); Sivakumar Annamalai, Cupertino, CA (US)

(73) Assignee: Azul Systems, Inc., Mountain View, CA (US)

( * ) Notice: Subject to any disclaimer, the term of this patent is extended or adjusted under 35 U.S.C. 154(b) by 303 days.

(21) Appl. No.: 10/858,832

(22) Filed: Jun. 1, 2004

Related U.S. Application Data

(63) Continuation-in-part of application No. 10/378,061, filed on Feb. 28, 2003.

(51) Int. Cl.
*G06F 12/00* (2006.01)

(52) U.S. Cl. .............................................. 711/6; 711/2

(58) Field of Classification Search ...................... None
See application file for complete search history.

(56) References Cited

U.S. PATENT DOCUMENTS

| 5,341,484 | A | * | 8/1994 | Tanaka et al. ............... 718/100 |
| 6,070,173 | A | * | 5/2000 | Huber et al. ................ 707/206 |
| 6,725,366 | B1 | * | 4/2004 | Swanberg .................... 712/233 |

OTHER PUBLICATIONS

Czajkowski et al, "Automated and Portable Native Code Isolation", Sun Microsystems, SMLI TR-2001-96, Apr. 2001.

* cited by examiner

*Primary Examiner*—Reginald G. Bragdon
*Assistant Examiner*—Thanh D Vo
(74) *Attorney, Agent, or Firm*—Van Pelt, Yi & James LLP

(57) ABSTRACT

Accessing data comprises executing a set of computer instructions in a first environment, wherein the first environment has limited addressing capability to address memory up to a size limit, specifying a set of data in a memory space of a second environment, wherein the memory space has a size that exceeds the size limit, and accessing the set of data from the first environment using the limited addressing capability.

19 Claims, 8 Drawing Sheets

EXPANDED MEMORY SPACE IN ENVIRONMENTS INCLUDING VIRTUAL MACHINES

CROSS REFERENCE TO RELATED APPLICATIONS

This application is a continuation in part of U.S. patent application Ser. No. 10/378,061 entitled SEGMENTED VIRTUAL MACHINE filed Feb. 28, 2003, which is incorporated herein by reference for all purposes.

FIELD OF THE INVENTION

The present invention relates generally to computer programming. More specifically, a technique of data access is disclosed.

BACKGROUND OF THE INVENTION

Computer systems usually have limited memory addressing capabilities. The typical processor or system is designed to allow processes to address memory in a memory space up to a certain size limit. Software applications are often compiled to operate within the limited memory space. It is often difficult or expensive to upgrade such systems when the next generation systems with increased memory size limit become available. For example, many of the existing systems support a 32-bit architecture that limits the addressable memory space of processes to approximately $2^{32}$, or 4 gigabytes. As programs become more sophisticated and consume more memory, 4 gigabytes of memory space may become inadequate. The next generation 64-bit systems provide much greater memory addressing capabilities, however, migrating from 32-bit systems to 64-bit systems tend to be an expensive proposition because of the software upgrades required. Since many applications are compiled specifically for one type of system, upgrading from a 32-bit system to a 64-bit system would typically require that these legacy 32-bit applications be replaced with new applications specifically compiled for the 64-bit platform, therefore increasing the cost of the upgrade.

Some systems that include multiple software components configured to collaborate in 32-bit environments face additional barrier to upgrades. For example, an application may interact with drivers or libraries to perform desired functions in a 32-bit environment. If any of the components is not available for the 64-bit platform, it is likely that the system as a whole cannot successfully migrate to a 64-bit system.

It would be desirable if legacy software can take advantage of the larger memory space supported by newer systems. It would also be desirable if software components configured to operate in environments that support different memory space sizes can interoperate transparently, without requiring recompilation.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

A data access technique is disclosed. In some embodiments, a set of computer instructions is executed in a first environment that has limited addressing capability to address memory up to a size limit. Data is specified in a memory space of a second environment, where the memory space has a size that exceeds the size limit. The data specified in the memory space of the second environment may be accessed from the first environment using the limited addressing capability of the first environment.

Figure 1:
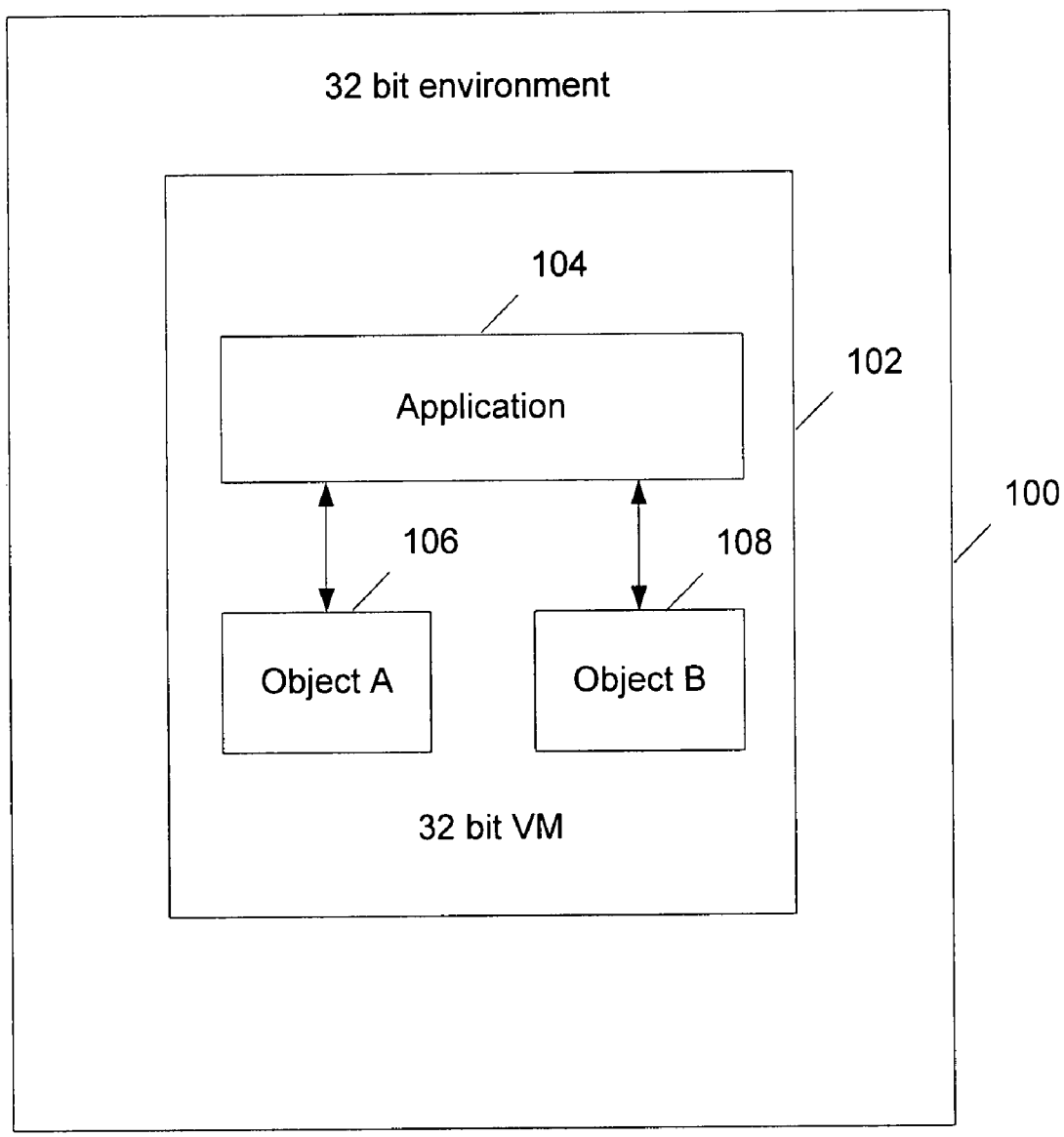
FIG. 1 is a system diagram illustrating an application configured to operate in an environment with limited memory addressing capabilities, according to some embodiments.

FIG. 1 is a system diagram illustrating an application configured to operate in an environment with limited memory addressing capabilities, according to some embodiments. In this example, environment 100 allows its processes to address up to 32 bits of memory. As used herein, an environment refers to the hardware platform, the operating system, as well as other appropriate hardware, firmware, software components and combinations thereof that allow computer instructions to be executed. The memory space associated with an environment refers to the range of memory that can be addressed by computer instructions operating in the environment. Virtual memory techniques are sometimes used to address the memory space. In the example shown, environment 100 is a 32-bit environment, which means that the memory space addressable by computer instructions operating in environment 100 is limited to 32 bits. An application 104 executes within a 32-bit virtual machine (VM) 102. Examples of environments that support virtual machine include Java, Microsoft .NET, etc. As shown, the application can directly address no more than the maximum amount of memory addressable by the virtual machine, which is approximately 4 gigabytes in this example.

Figure 2:
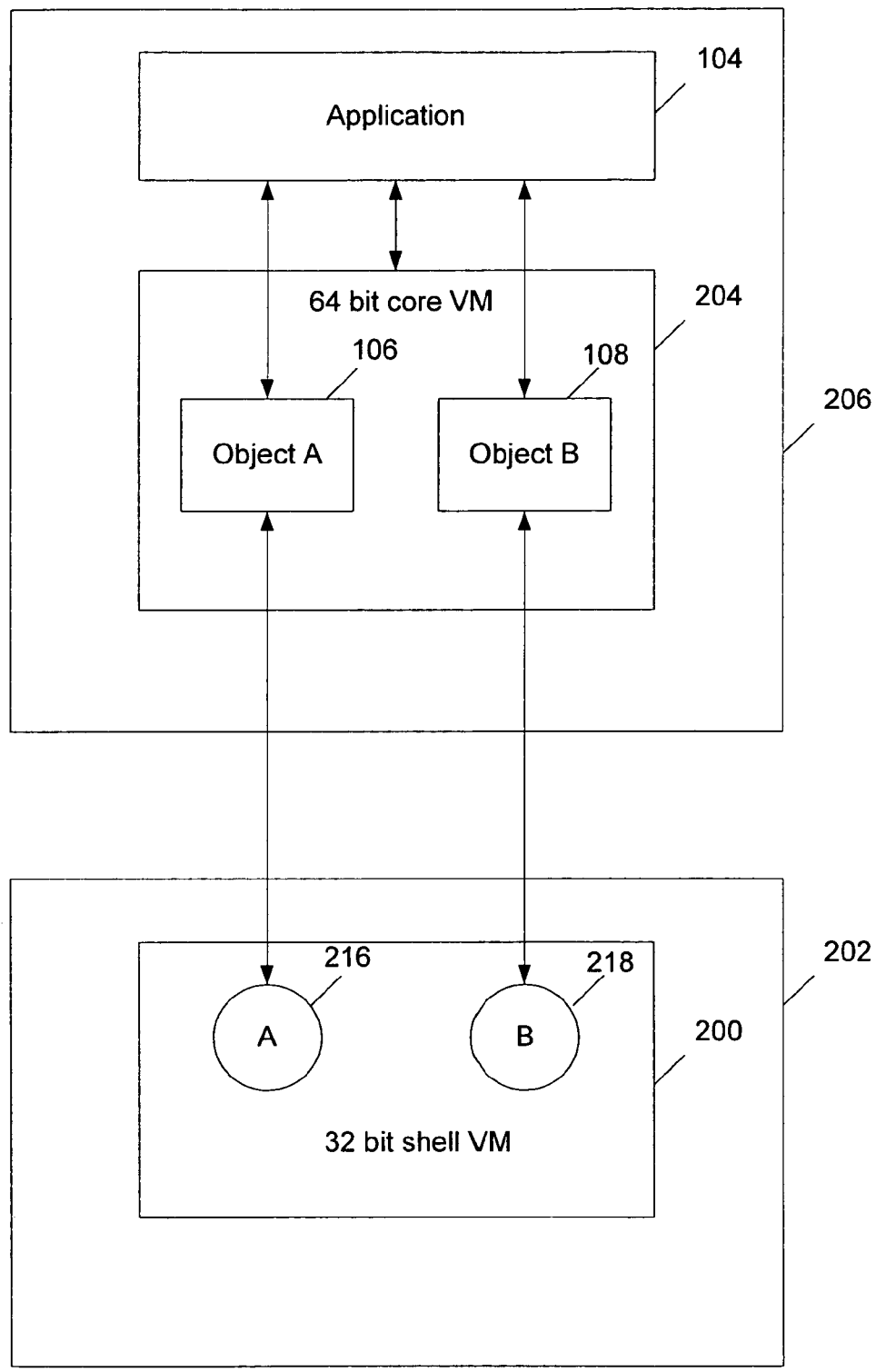
FIG. 2 is a diagram illustrating an application operating in a segmented virtual machine embodiment.

FIG. 2 is a diagram illustrating an application operating in a segmented virtual machine embodiment. In this example, an application such as application 104 of FIG. 1 is configured to operate in a 64-bit environment, within a segmented VM. The segmented VM shown in this example may be implemented using the techniques described in U.S. patent application Ser. No. 10/378,061 entitled SEGMENTED VIRTUAL MACHINE filed Feb. 28, 2003, which is incorporated herein by reference above. In some embodiments, a segmented virtual machine includes a shell VM and a core VM. The core VM is configured to perform VM internal execution functions such as memory management, data processing, data transfer, etc. The shell VM is configured to perform shell VM functions such as interfacing with the external environment, communicating with the core VM, etc. The shell VM and the core VM may reside on the same device, or on separate devices.

In the example shown, in a 64-bit environment 206, application 104 cooperates with a 64-bit core VM 204, which cooperates with a 32-bit shell VM 200. The shell VM operates in a 32-bit environment 202 that includes components capable of addressing up to 32 bits of memory. The bit numbers of the environments are chosen for the purposes of example; other numbers may be used in other embodiments. The 64-bit and 32-bit environments may be configured to operate on separate devices. For example, the 32-bit environment of some embodiments includes an IA32 processor based system that supports operating systems such as Linux, Windows, etc., while the 64-bit environment includes specialized hardware designed to provide greater processing power and resources. In some embodiments, the 64-bit and 32-bit environments reside on a single device such as a SPARC Server that is capable of supporting both environments. By using a segmented VM, existing 32-bit legacy software can be reused when other parts of the system migrate to 64-bit platform.

In this example, application 104 is written in a portable language such as Java that does not directly manipulate the memory addresses and uses references to address objects and their associated memory. As a result, application 104 does not need to be recompiled or substantially modified in order for it to execute in the 64-bit environment. Objects allocated by application 104 can be indirectly accessed or referenced from native code the 32-bit environment by handles residing in the shell VM. Although the handles in this example are limited to 32 bits, the objects referenced by the handles may occupy up to 64 bits of memory. For example, objects 216 and 218 are allocated in the memory space of the 64-bit environment and can be referenced from the 32-bit environment by handles 216 and 218, respectively. By using handles to reference objects in the core VM from the shell VM, data specified in a 64-bit memory space may be accessed from a 32-bit environment, even though the 64-bit memory space size exceeds the size limit that the 32-bit environment is capable of directly addressing.

For the purposes of illustration, accessing objects using object handles is discussed extensively throughout the specification, although by using similar techniques, other structures may be accessed via appropriate references. For example, according to some embodiments, methods or functions can be allocated in a 64-bit core VM and referenced by method identifiers that reside in a 32-bit shell VM. In some embodiments, fields of objects are allocated on the 64-bit core VM and are referenced by field identifiers that reside in the 32-bit shell VM.

Figure 3:
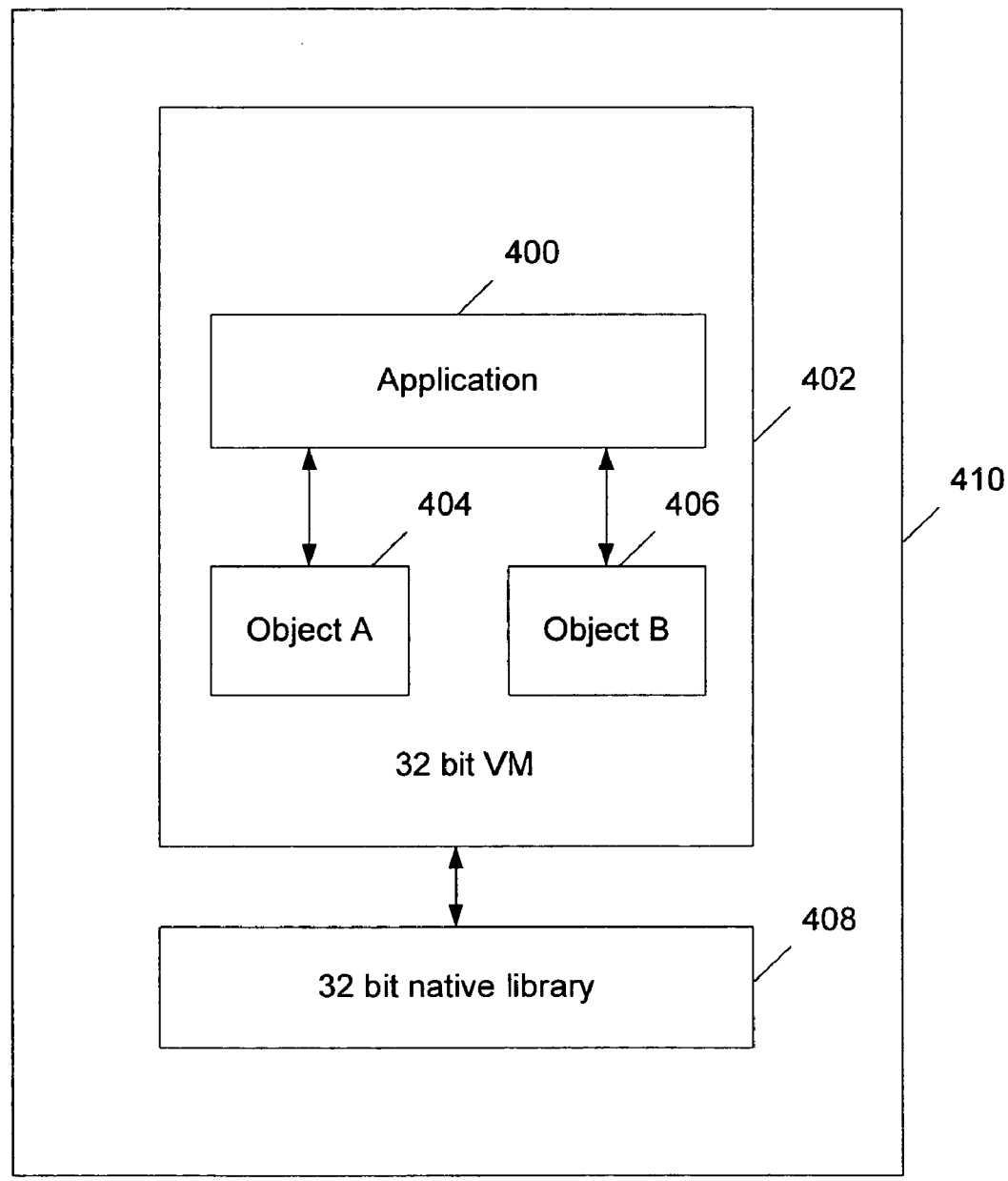
FIG. 3 is a system diagram illustrating another system configured to operate in an environment with limited memory addressing capabilities.

FIG. 3 is a system diagram illustrating another system configured to operate in an environment with limited memory addressing capabilities. In this example, in a 32-bit environment 410, an application 400 operates within a 32-bit VM 402. A native library 408 cooperates with the virtual machine to perform functions and instructions that are specific to the 32-bit environment. In the system shown, the 32-bit native library requires recompilation in order to operate in a 64-bit environment. However, recompilation may not be feasible in some cases due to factors such as lack of access to the source code. In the example below, a segmented virtual machine allows application 400 to operate in a 64-bit environment and take advantage of the greater memory space without requiring the 32-bit native library to be recompiled.

Figure 4:
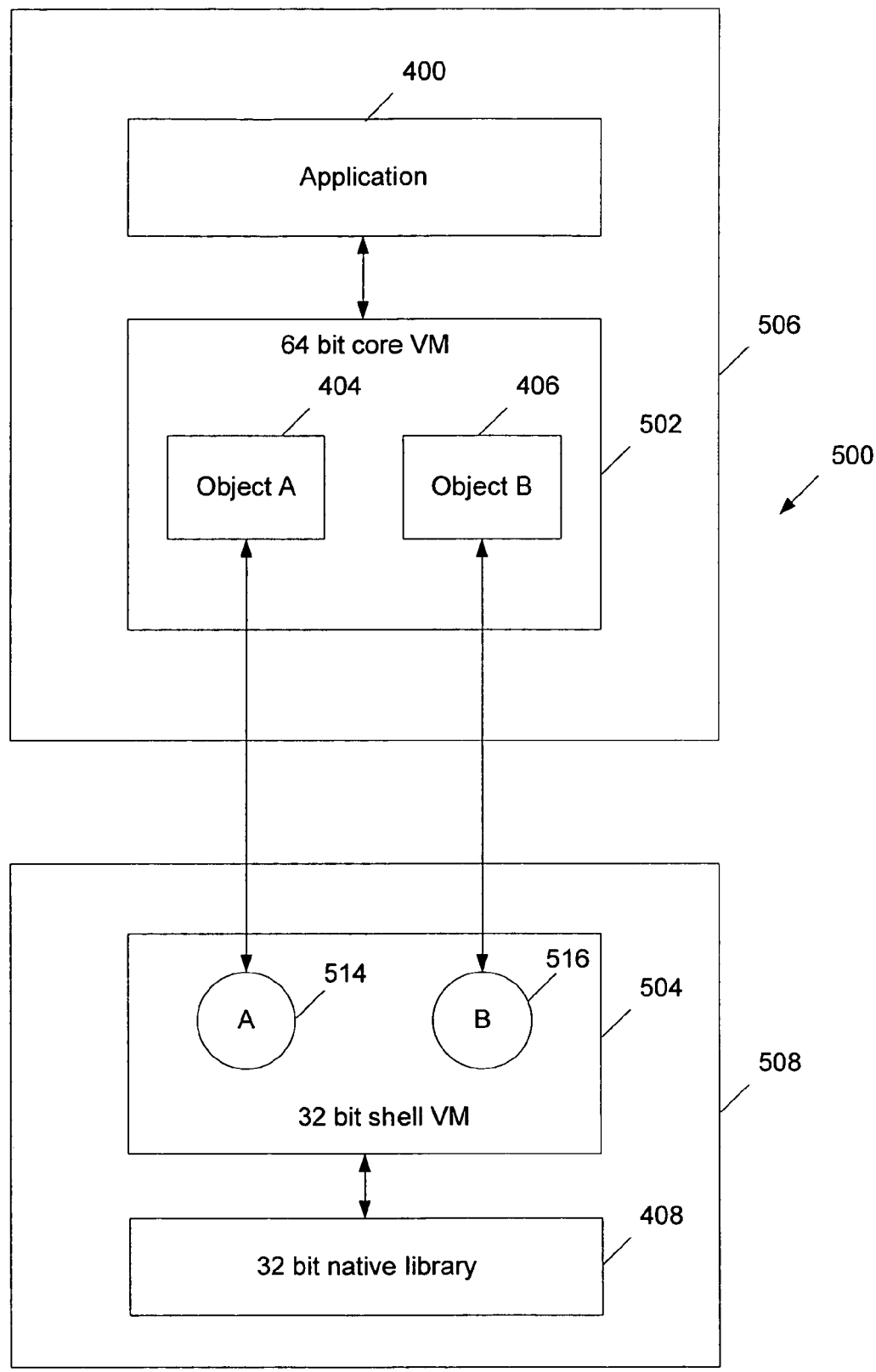
FIG. 4 is a diagram illustrating another segmented virtual machine example.

FIG. 4 is a diagram illustrating another segmented virtual machine example. In this example, application 400 is configured to execute in a 64-bit environment 506. The application is able to invoke native library 408, which is configured to execute in a 32-bit environment 508. The application cooperates with a segmented virtual machine that includes a 64-bit core VM 502 and a 32-bit shell VM 504, operating in environments 506 and 508, respectively. Objects allocated by the application reside in the 64-bit environment, within the 64-bit core VM. The objects are referenced in the shell VM via 32-bit handles such as 514 and 516. In some embodiments, an object can also be referenced via a 64-bit handle in the 64-bit core VM. When the core VM is ready to invoke instructions in the shell VM, the 64-bit handles of one or more objects associated with the instructions are translated to the corresponding 32-bit handles, and a reverse translation takes place when the shell VM is ready to invoke instructions in the core VM. Thus, the native library operating in the 32-bit environment can be invoked by the application to operate on objects allocated in the 64-bit environment and vice versa. Details of the operation are discussed below.

Figure 5:
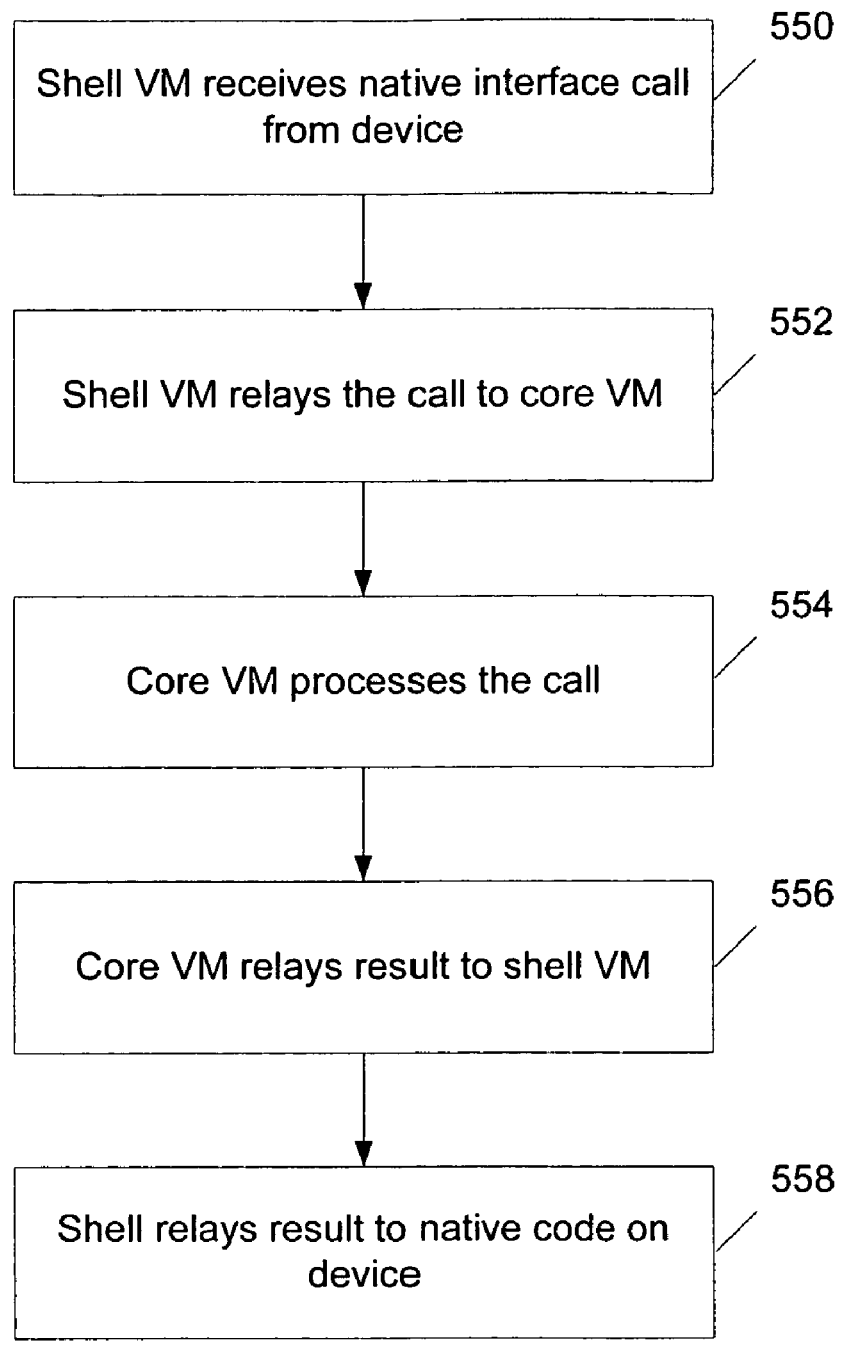
FIG. 5 is a flowchart illustrating a callback from the native library to the application, according to the embodiment shown in FIG. 4.

Native interface calls such as Java Native Interface (JNI) calls and callbacks are sometimes used to facilitate calls between the native library and the application. FIG. 5 is a flowchart illustrating a callback from the native library to the application, according to the embodiment shown in FIG. 4. In this example, the native library initiates a call to the application by making a native interface callback. The shell VM receives a native interface callback made by the native code on the shell VM device (550), and relays the call to the core VM (552). The core VM processes the call and performs any logic necessary to produce the desired result (554). The core VM sends the result back to the shell VM (556), and the shell VM relays the result back to the native code on the shell VM device (558).

Figure 6:
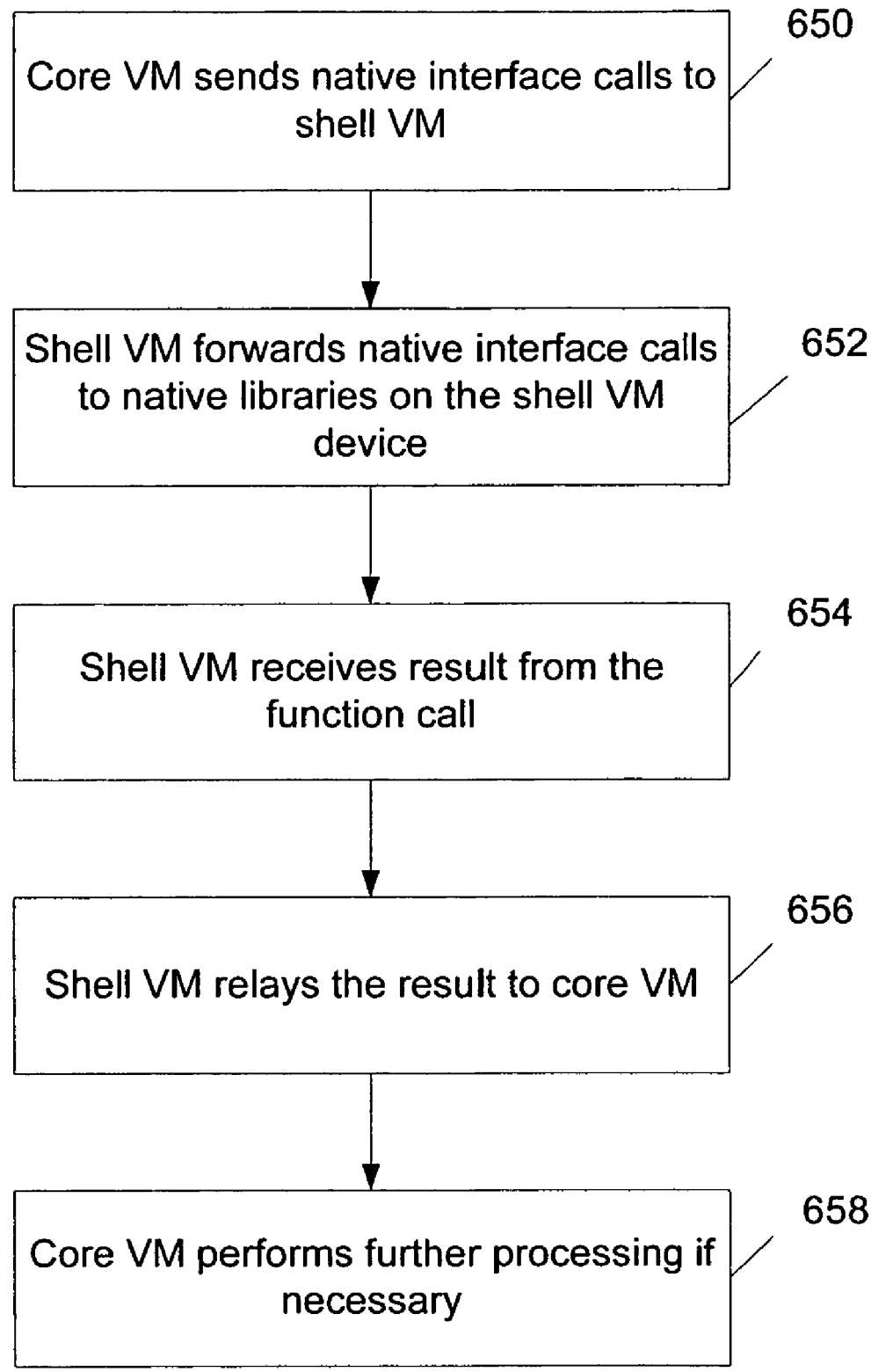
FIG. 6 is a flowchart illustrating the processing of a function call by a segmented virtual machine, according to the embodiment shown in FIG. 4.

FIG. 6 is a flowchart illustrating the processing of a function call by a segmented virtual machine, according to the embodiment shown in FIG. 4. In this example, application 400 makes a native interface call to invoke a function supported by native library 408. The call is sent to the core VM. Upon receiving the native interface call from the application, the core VM forwards the call to the shell VM (650). The shell VM then forwards the native interface call to the native libraries on the shell VM device, which perform operations according to the native interface call (652). The shell VM receives the result from the function call to the native libraries (654). The shell VM then relays the result to the core VM (656), which performs further processing if necessary (658).

Figure 7:
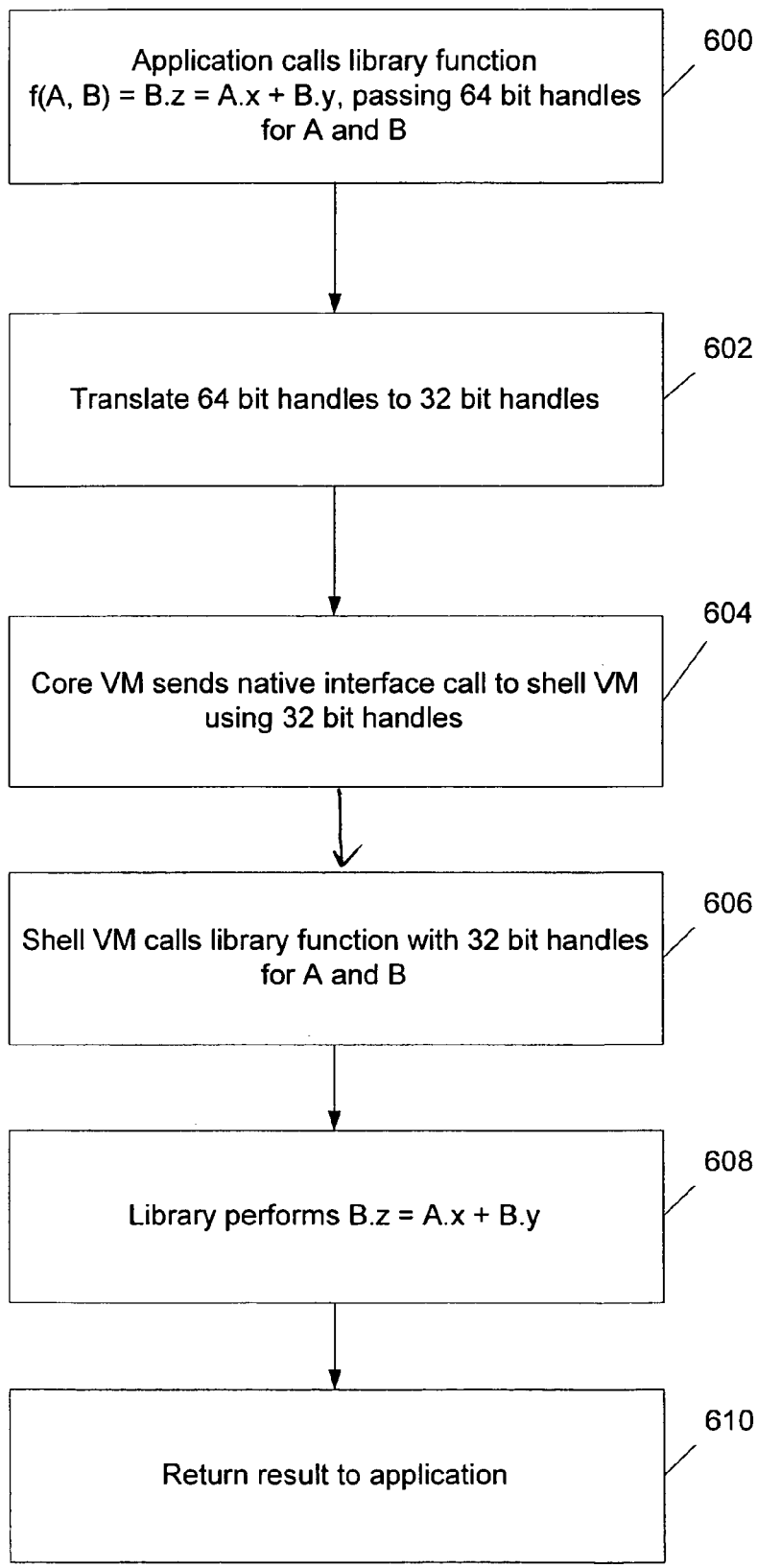
FIG. 7 is a flowchart illustrating in detail the processing of a native library call according to the example shown in FIG. 6.

FIG. 7 is a flowchart illustrating in detail the processing of a native library call according to the example shown in FIG. 6. In this example, the processing of a library function call, f(A, B)=B.z=A.x+B.y, is used to illustrate the cooperation among the application, the segmented virtual machine and the native library. Application 400 calls the library function, and 64-bit handles for objects A and B are passed to the function call in the core VM (600). The 64-bit handles are then translated into 32-bit handles (602). In this example, application 400 is a Java application and objects A and B are global objects. The handles for these global objects are allocated from a specific region in the memory space. The starting point of this memory region is referred to as a base address. In some embodiments, to derive a 32-bit handle from a 64-bit handle, the base address is subtracted from the 64-bit handle. The core VM then invokes the native library by sending a native interface call to the shell VM. The 32-bit handles for objects A and B are passed to the native interface call (604). The shell VM then invokes the 32-bit native library function using the 32-bit handles (606). The library performs the function as required (608). Details of how the library performs the function are discussed below. The results are then returned to the application (610).

Figure 8:
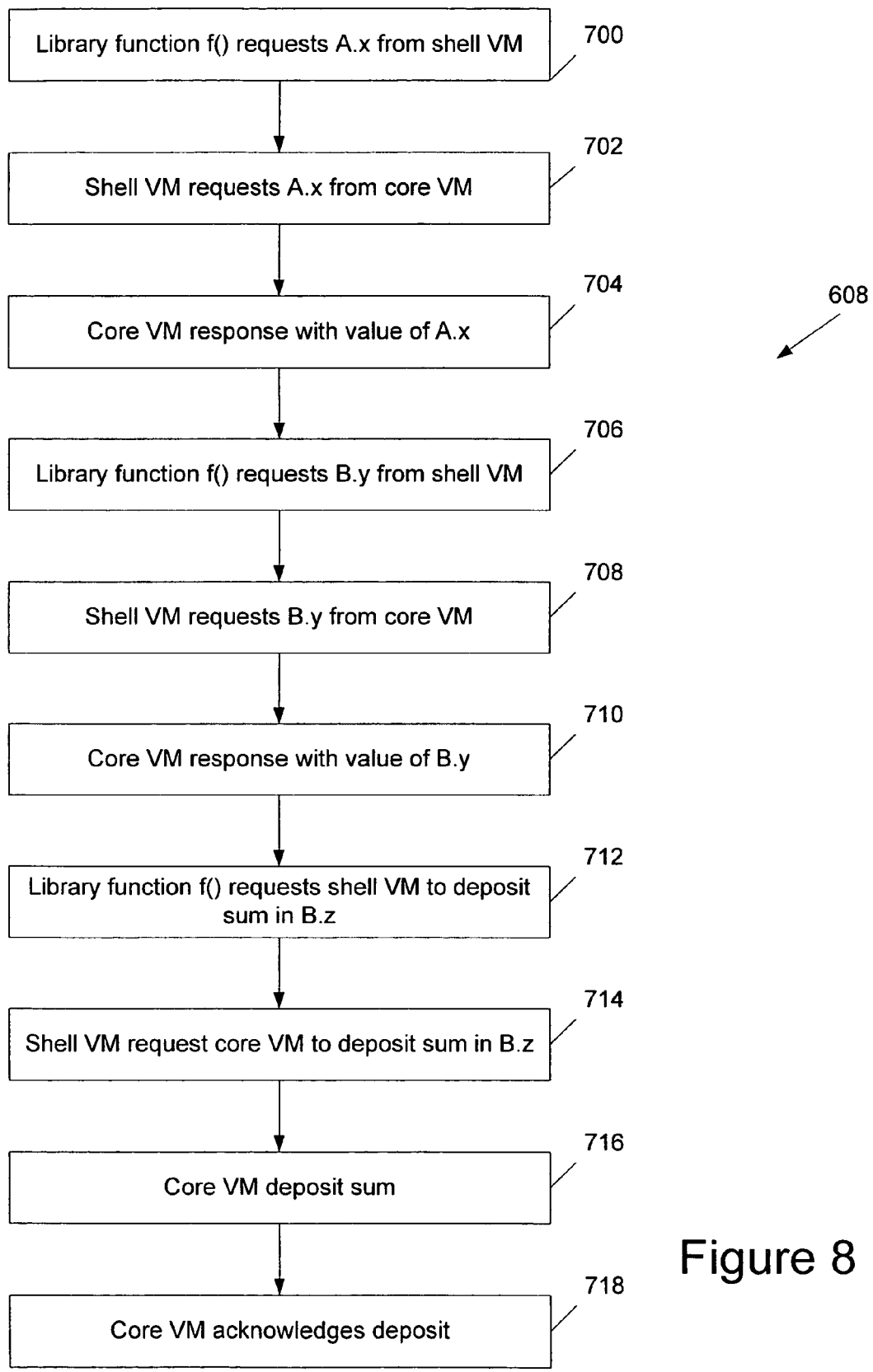
FIG. 8 is a flowchart illustrating the details of how the library function is performed according to some embodiments (608 of FIG. 6).

FIG. 8 is a flowchart illustrating the details of how the library function is performed according to some embodiments (608 of FIG. 6). In this example, the native library function, f(A, B)=B.z=A.x+B.y is invoked and executed. The native library performs a GET operation to obtain the values of A.x and B.y, then performs a PUT operation to update the value of B.z. To get the value of A.x, the library function requests A.x from shell VM (700). The shell VM passes the request of A.x to the core VM (702), and the core VM responds with the value of A.x (704). To get the value of B.y, the library function requests B.y from the shell VM (706). The shell VM passes the request for B.y to the core VM (708), and the core VM responds with the value of B.y (710). To perform the PUT function, the library function requests the shell VM to deposit the sum in B.z (712). The shell VM then requests the core VM to deposit the sum in B.z (714). The core VM deposits the sum as requested (716) and acknowledges the deposit (718).

A data access technique has been disclosed. For the purposes of example, accessing data in a 64-bit memory space from a 32-bit environment is discussed extensively throughout this specification, although the technique is also applicable to data access between two or more environments with different memory addressing capabilities.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of accessing data, comprising:
   executing a set of computer instructions in a first environment, wherein the first environment includes a shell virtual machine that has limited addressing capability to address memory up to a size limit and execute computer instructions that are capable of directly addressing memory up to the size limit;
   specifying a set of data in a memory space of a second environment, wherein the memory space has a size that exceeds the size limit, the second environment is an environment separate from the first environment, wherein the second environment includes a core virtual machine that has greater addressing capability than the shell virtual machine included in the first environment; and
   accessing from the first environment the set of data in the memory space of the second environment, the access includes using the limited addressing capability.

2. A method of accessing data as recited in claim 1, wherein the first environment is a 32-bit environment and the second environment is a 64-bit environment.

3. A method of accessing data as recited in claim 1, wherein the first environment and the second environment operate on the same device.

4. A method of accessing data as recited in claim 1, wherein the first environment and the second environment operate on separate devices.

5. A method of accessing data as recited in claim 1, further comprising specifying a handle to the set of data.

6. A method of accessing data as recited in claim 1, wherein accessing the set of data from the first environment includes specifying a handle for the set of data in the first environment.

7. A method of accessing data as recited in claim 1, further comprising specifying a handle to the set of data and storing the handle in the first environment.

8. A method of accessing data as recited in claim 1, wherein accessing the set of data from the first environment includes performing a native interface call in the first environment.

9. A method of accessing data as recited in claim 1, further comprising specifying a handle to the set of data and storing the handle in the first environment, and wherein accessing the set of data from the first environment comprises translating the handle 10. A method of accessing data as recited in claim 1, wherein accessing the set of data from the first environment includes cooperating with a core virtual machine operating in the second environment.

11. A method of accessing data as recited in claim 1, wherein specifying the set of data is performed in a virtual machine.

12. A method of accessing data as recited in claim 1, wherein specifying the set of data is performed in a segmented virtual machine.

13. A method of accessing data as recited in claim 1, wherein the set of computer instructions include instructions native to the first environment.

14. A method of accessing data as recited in claim 1, wherein the set of computer instructions target a virtual machine.

15. A method of accessing data as recited in claim 1, wherein the set of data includes a Java object.

16. A method of accessing data as recited in claim 1, wherein the set of data is specified by a program in the second environment, wherein the program is able to execute in the first environment without recompiling.

17. A method of accessing data as recited in claim 1, wherein the set of data is specified by a program in the second environment, wherein the program is able to execute in the first environment without substantial modification to the program.

18. A computer program product for accessing data, the computer program product being embodied in a computer readable storage medium and comprising computer instructions for:
   executing a set of computer instructions in a first environment, wherein the first environment includes a shell virtual machine that has limited addressing capability to address memory up to a size limit and execute computer instructions that are capable of directly addressing memory up to the size limit; specifying a set of data in a memory space of a second environment, wherein the memory space has a size that exceeds the size limit, the second environment is an environment separate from the first environment, wherein the second environment includes a core virtual machine that has greater addressing capability than the shell virtual machine included in the first environment; and accessing from the first environment the set of data in the memory space of the second environment, the access includes using the limited addressing capability.

19. A system for accessing data, comprising:

a shell virtual machine operating in a first environment comprising a first processor, wherein the shell virtual machine has limited addressing capability to address memory up to a size limit and execute computer instructions that are capable of directly addressing memory up to the size limit; and a core virtual machine operating in a second environment comprising a second processor, wherein:

the core virtual machine is configured to specify a set of data in a memory space of a second environment and to allow access of the set of data from the first environment, wherein the memory space has a size that exceeds the size limit, the second environment is an environment separate from the first environment, and the core virtual machine has greater addressing capability than the shell virtual machine included in the first environment.

* * * * *